(12) United States Patent
Hall

(10) Patent No.: US 11,158,200 B2
(45) Date of Patent: Oct. 26, 2021

(54) DECENTRALIZED COLLISION AVOIDANCE FOR UAVS

(71) Applicant: AT&T Intellectual Property I, L.P., Atlanta, GA (US)

(72) Inventor: Robert J. Hall, Berkeley Heights, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 82 days.

(21) Appl. No.: 16/376,852

(22) Filed: Apr. 5, 2019

(65) Prior Publication Data
US 2020/0320888 A1 Oct. 8, 2020

(51) Int. Cl.
| G08G 5/04 | (2006.01) |
| G08G 5/00 | (2006.01) |
| B64C 39/02 | (2006.01) |

(52) U.S. Cl.
CPC ........... *G08G 5/045* (2013.01); *B64C 39/024* (2013.01); *G08G 5/0008* (2013.01); *G08G 5/0069* (2013.01); *B64C 2201/141* (2013.01)

(58) Field of Classification Search
None
See application file for complete search history.

(56) References Cited

U.S. PATENT DOCUMENTS

| 9,633,567 | B1* | 4/2017 | Skoog | G06F 30/20 |
| 9,997,080 | B1 | 6/2018 | Chambers et al. | |
| 2007/0078600 | A1 | 4/2007 | Fregene et al. | |
| 2014/0222248 | A1* | 8/2014 | Levien | B64C 39/024 701/2 |
| 2018/0139152 | A1 | 5/2018 | Shaw et al. | |
| 2018/0204469 | A1* | 7/2018 | Moster | B64C 39/024 |
| 2019/0019418 | A1* | 1/2019 | Tantardini | G08G 5/0013 |
| 2020/0105151 | A1* | 4/2020 | Mahkonen | H04W 4/06 |

* cited by examiner

*Primary Examiner* — Tamara L Weber
(74) *Attorney, Agent, or Firm* — BakerHostetler (57) ABSTRACT

A method includes recording, by a first UAV, a current position of the first UAV, comparing, the current position of the first UAV to a current flight plan of the first UAV, and geocasting a first track declaration message. The method may further include receiving, by the first UAV, a second track declaration message generated by a second UAV, detecting a potential collision with the second UAV and executing a collision avoidance maneuver by the first UAV.

17 Claims, 11 Drawing Sheets

FIG. 10

DECENTRALIZED COLLISION AVOIDANCE FOR UAVS

TECHNICAL FIELD

Embodiments of the present inventions relate to methods and systems for controlling unmanned aerial vehicles (UAVs), and more particularly to methods and systems that enable UAV's to avoid collisions independent of a central controller.

BACKGROUND

Today many companies are greatly expanding their use of UAVs. UAVs have been used for military applications, search-and-rescue missions, scientific research, delivering goods, and other uses. UAVs are becoming more and more prevalent and will crowd the skies in the near future. UAVs must be made safe and reliable to operate, even in crowded skies and under autonomous control at long distance and beyond visual line of sight of controllers. The only way commercial use of UAVs will be profitable and lead to large revenues and cost savings is if systems and methods are developed to make them safe and reliable in crowded skies under autonomous or semi-autonomous control.

One solution that has been proposed is to assume and use a central traffic management system, such as a UAS Traffic Management (UTM) System which is being developed by NASA. However, UTM systems are not widely available and working today and are not likely to be widely deployed any time soon. Moreover, even when they are deployed, such UTM systems are unlikely to be universal in coverage, so operating UAVs away from the centers where UTMs are deployed will remain a problem. What is needed is a system and method for collision avoidance of UAVs regardless of where such UAVs are operating.

SUMMARY

The present disclosure is directed to a method including determining, by a first UAV, a current position of the first UAV, comparing, by the first UAV, the current position of the first UAV to a current flight plan of the first UAV, geocasting, by the first UAV, a first track declaration message identifying the current position of the first UAV and the current flight plan of the first UAV. The method may further include calculating, by the first UAV, a radius of uncertainty for the current position of the first UAV and wherein the first track declaration message includes the current position of the first UAV in view of the radius of uncertainty. In an aspect, the method may further include determining, by the first UAV, a time period since the sending step was last executed and if the time period exceeds a threshold time period, then geocasting, by the first UAV, an updated track declaration message. In an aspect, the method may also include changing, by the first UAV, the current flight plan to an updated flight plan and geocasting, by the first UVA an updated track declaration message identifying the updated flight plan.

In an aspect, the method may also include receiving, by the first UAV, a second track declaration message generated by a second UVA, detecting, by the first UAV, a potential collision with the second UAV and executing, by the first UAV, a first collision avoidance maneuver and detecting, by the first UAV, a potential collision with the first UAV and executing, by the second UAV, a second collision avoidance maneuver. In an aspect, the first UAV may create a first set of collision avoidance maneuvers and the second UAV may create a second set of collision avoidance maneuvers and wherein the first collision avoidance maneuver is selected randomly from the first set of collision avoidance maneuvers and the second collision avoidance maneuver is selected from the second set of collision avoidance maneuver. In an aspect, the first collision avoidance maneuver may include one of hovering by the first UAV, bending the current flight track of the first UAV, or adjusting the altitude of the current flight track of the first UAV to create an updated flight plan. In an aspect, the method may include geocasting, by the first UAV, a second track declaration message identifying the current position of the first UAV and an updated flight plan of the first UAV.

The present disclosure is also directed to a method including receiving, by a first UAV, a track declaration message generated by a second UVA, detecting, by the first UAV, a potential collision with the second UAV based on the receiving step; and executing, by the first UAV, a first collision avoidance maneuver in response to the detecting step. In an aspect, the method may further include simulating, by the first UAV, the first collision avoidance maneuver and determining whether the first collision avoidance maneuver will be effective in avoiding the potential collision prior to the executing step. In an aspect, the method may include determining, by the first UAV, a first set of collision avoidance maneuvers and wherein the first collision avoidance maneuver is randomly selected from the first set of collision avoidance maneuvers and geocasting, by the first UAV, a second track declaration message identifying the current position of the first UAV and an updated flight plan of the first UAV based on the first collision avoidance maneuver.

The disclosure is also directed to a system including a first UAV and a second UAV, each of the first UAV and the second UAV having a capability to send and receive geocast messages, the first UAV having a first processor and a first memory coupled with the first processor, the first memory having stored thereon executable instructions that when executed by the first processor cause the first processor to effectuate operations including geocasting a first track declaration message, receiving a second track declaration message geocast by the second UAV, determining if a flight track of the first UAV may have a collision based on a flight track of the second UAV, creating a collision avoidance maneuver, simulating an alternative flight track based on the collision avoidance maneuver, executing the collision avoidance maneuver if the simulating step indicates that the alternative flight track will avoid the collision and geocasting the alternative flight track. The operations may further include generating a set of collision avoidance maneuvers and the collision avoidance maneuver is randomly selected from the set of collision avoidance maneuvers and wherein the collision avoidance maneuver is one of hovering, bending the flight track, or changing the altitude of the flight track of the first UAV.

In an aspect, the second UAV may have a second processor and a second memory coupled with the second processor, the second memory having stored thereon executable instructions that when executed by the second processor cause the second processor to effectuate operations including geocasting the second track declaration message, receiving the first track declaration message sent by the first UAV, determining if a flight track of the first UAV may have a collision based on the flight track of the second UAV, creating a second collision avoidance maneuver to be performed by the second UAV, simulating a second alternative flight track of the second UAV based on the second collision avoidance maneuver and executing the second collision avoidance maneuver if the simulating step indicates that the second alternative flight track will avoid the collision

BRIEF DESCRIPTION OF THE DRAWINGS

The following detailed description of preferred embodiments is better understood when read in conjunction with the appended drawings. For the purposes of illustration, there is shown in the drawings exemplary embodiments; however, the subject matter is not limited to the specific elements and instrumentalities disclosed. In the drawings.

DETAILED DESCRIPTION OF EMBODIMENTS

Operational Summary. The present disclosure solves the problem of keeping UAVs from colliding using decentralized messaging and distributed protocols, thereby not requiring centralized traffic management solutions. There are three main components comprising this disclosure: (1) a Geocast-based Track Declaration (GTD) Protocol allowing UAVs to exchange information about their current position and future track, (2) a Simulation-based Conflict Detection (SCD) algorithm using which a UAV can compute whether its track will conflict with (i.e. potentially collide with) that of any other UAV it has heard from, and a Conflict Avoidance Contingency Behavior (CACB), which is a procedure by which the UAV determines what action(s) to take to alter its own flight plan to avoid the collision.

The UAVs' onboard position and altitude sensing is uncertain. Accordingly, the present disclosure provides a system for a UAV's onboard autonomy to implement spacing enforcement. Two UAVs' movements conflict when there is a time t at which the distance between their spatial positions (lat/long/alt) is less than the minimum spacing required, which is the sum of the uncertainty radii of the two UAVs plus an additional margin to account for external factors like wind.

Each UAV continually executes its GTD protocol and sends out its track declarations. It also listens for track declarations of others. As the UAV receives each track declaration from other UAVs, the receiving UAV adds or updates the information in its local database of track information known as its track operating picture (TOP). Each time the receiving UAV updates its TOP, it then executes its SCD to determine if any potential conflicts are detected. Whenever the receiving UAV detects a potential conflict, the receiving UAV executes its CACB and takes the resulting action. Every time the receiving UAV changes its own flight plan, the receiving UAV then sends out a new track declaration message and updates its own entry in its TOP.

Figure 1:
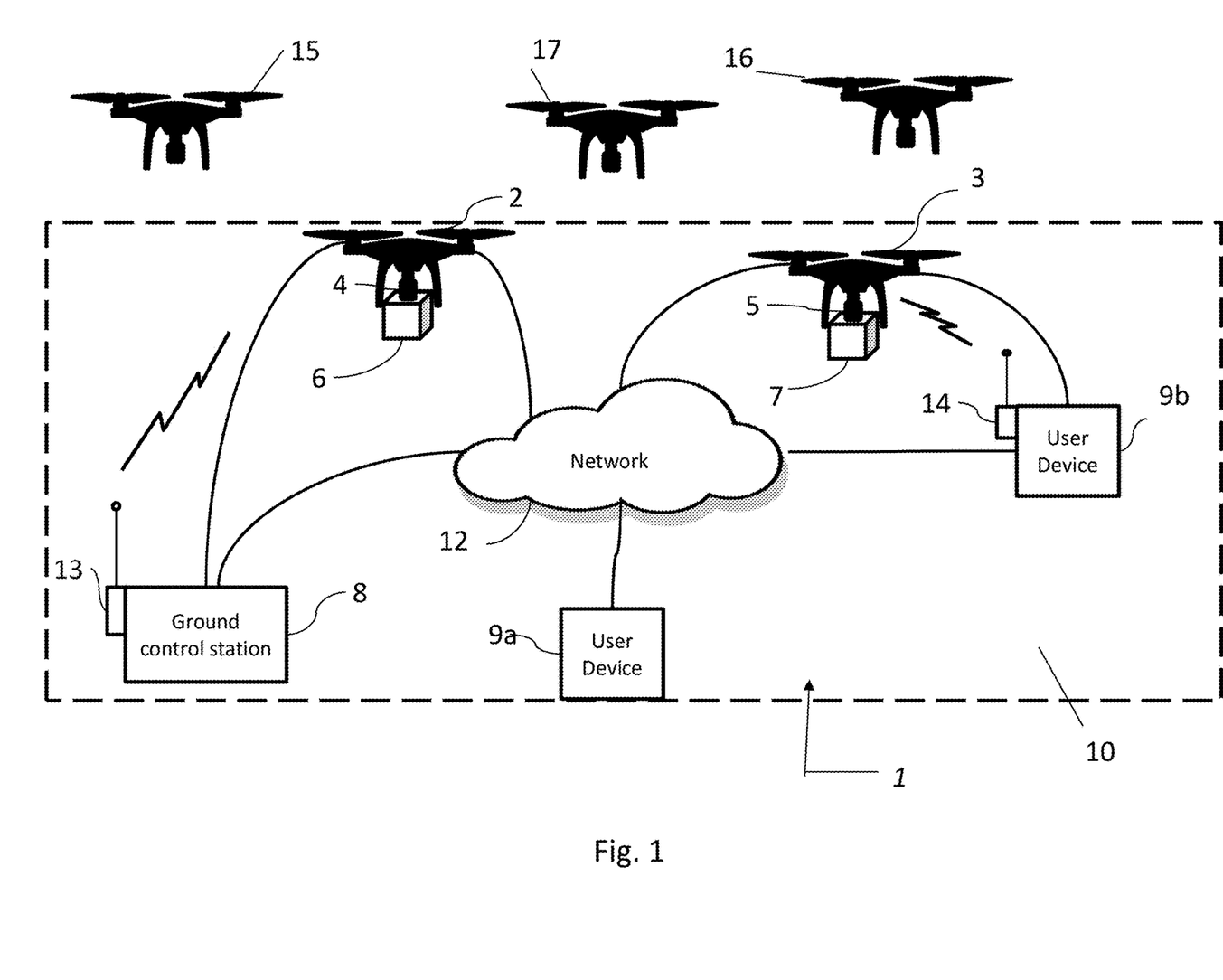
FIG. 1 is a schematic representation of an exemplary system environment in which the methods and systems of the present disclosure may be implemented.

System Environment. Illustrated in FIG. 1 is a schematic representation of an exemplary system environment 1 in which embodiments of the present disclosure may operate. The exemplary system environment 1 may include a sub-system 10 which, for example, may be run by a commercial operator. In such a sub-system 10, the command and control operations may be completely integrated. The sub-system 10 may include UAV 2 and UAV 3, each carrying sensors (sensor 4 and sensor 5) for collecting information or payloads (payload 6 and payload 7) for delivery. Although only two UAVs are illustrated in FIG. 1, it is contemplated that the sub-system 10 could encompass a plurality of UAVs. UAV 2 and UAV 3 may communicate with a command and control center 8 and a plurality of user devices 9a, 9b. Command and control center 8 may communicate with UAV 2 through a network 12 or an RF transmitter 13. Similarly, user device 9b may communicate with UAV 3 through the network 12 or an RF transmitter 14. In addition, command and control center 8 may form part of network 12. Network 12 may be a distributed network such as the Internet or a wireless cellular network, which may, for example, be a 3G, 4G LTE network, or any number of wireless networks that are capable of providing a communication interface to the plurality of UAVs, including advanced networks using software defined networks concepts.

While sub-system 10 may be self-contained and therefor the risk of a collision between UAV 2 and UAV 3 is minimal, other UAVs 15, 16 may be flying autonomously based on pre-programmed flight plans or be flying under the guidance of as a separate command and control network or connected to one or more other networks. Regardless, the sub-system 10 may not be able to prevent collisions based on these out-of-network UAVs 15, 16, 17.

Figure 2:
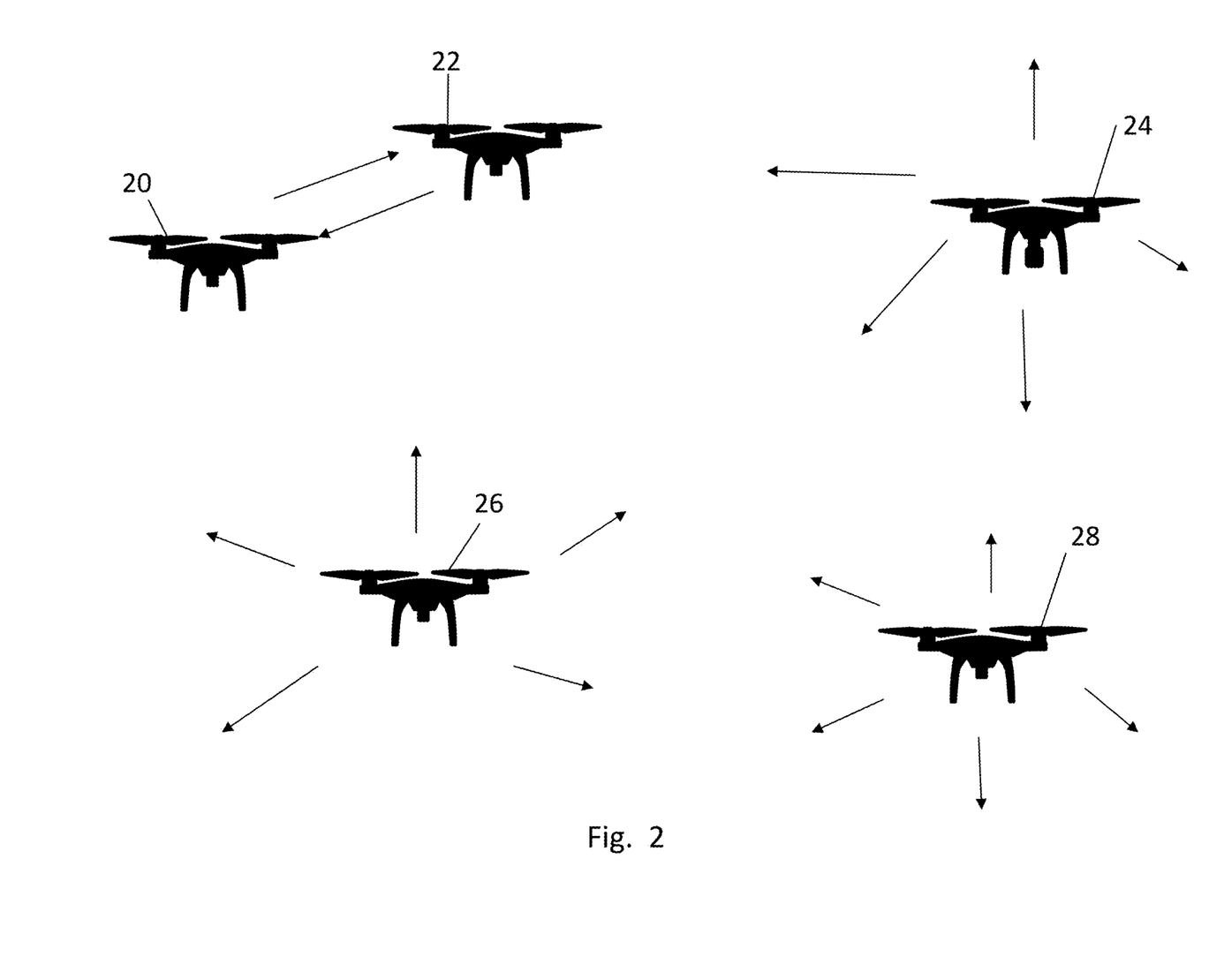
FIG. 2 is a system diagram of an alternative exemplary system environment in which the methods and systems of the present disclosure may be implemented.

With reference to FIG. 2, there is shown a plurality of UAVs 20, 22, 24, 26, 28 in a geographic area, which for a variety of reasons, may cluster near each other. There may be an event in which the plurality of UAVs 20, 22, 24, 26, 28 may desire to video. Policy enforcement may require that the plurality of UAVs 20, 22, 24, 26, 28 fly through a narrow corridor to avoid no-fly restrictions (such as approaching an airport, for example. Additionally, several UAVs may be delivering or picking up in a crowded urban area. In the example of FIG. 2, UAV 20 and UAV 22 may be in a position to be in conflict with each other, while UAV 24, UAV 26 and UAV 30 are flying independent of any other UAVs and are not in a position to be in conflict with any other UAVs.

Geocast-Based Track Declaration Protocol.

Geocast Messaging. Geocast is a communications framework for devices to address and send messages to other devices in a geographical area. The present disclosure may use an embodiment that includes the use of the AT&T Labs Geocast System, which is an implementation of geographic addressing and a routing programming interface. Other geocast-type or peer-to-peer communications systems may be used. Packets are addressed by a circle or radius r, consisting of the latitude/longitude of the center of the circle, plus the radius of the circle, which may, for example, be measured in meters. The Geocast system undertakes to deliver the messaging packet to all devices within that radius r.

Simulation-Based Conflict Detection System.

Figure 3A:
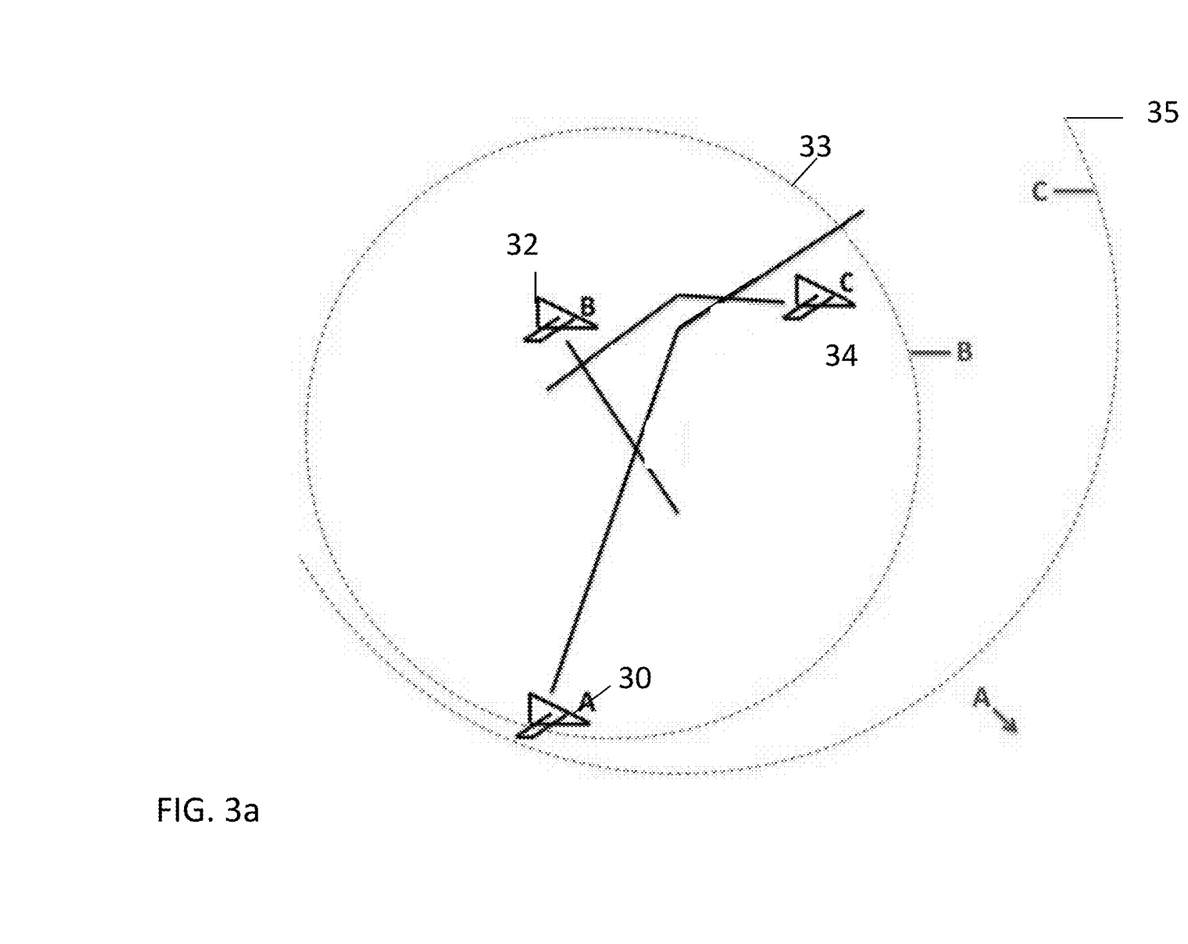
FIG. 3a is a system diagram of an exemplary embodiment of several UAVs issuing Geocast Track Declarations.

With respect to FIG. 3a, there is shown dashed circles 33, 35 that indicate the outer limits of the circle define by the radii within which track declaration messages will be geocasts. Each of the dashed circles 33, 35 are labeled with the ID of the sending UAV 32, 34 wherein the solid black lines represent the tracks of the UAVs 30, 32, 34. In this example, UAVA 30 is considered a fast-moving UAV and thus has a correspondingly large geocast region radius whereby its geocast region is not visible in the figure.

Figure 3B:
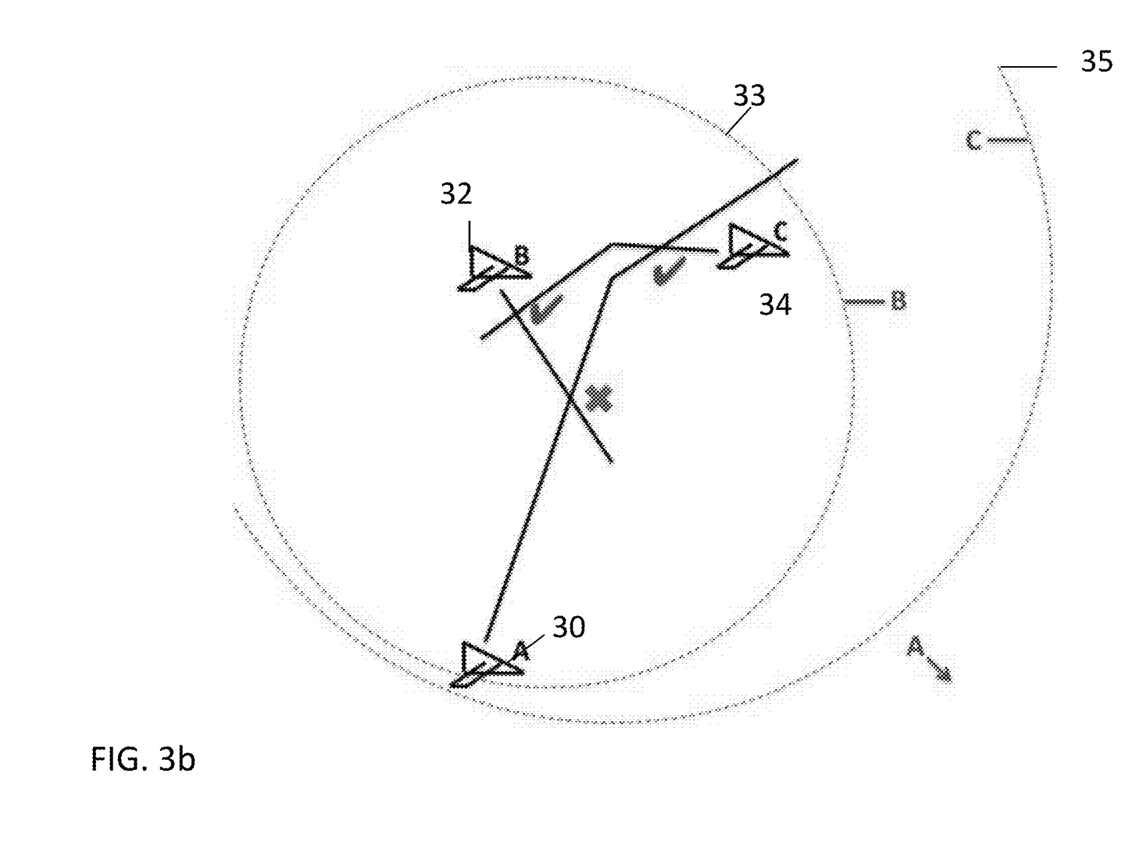
FIG. 3b is the system diagram of FIG. 3a showing potential UAV conflicts.

With respect to FIG. 3b, the paths of UAV 30, 32, 34 are shown with two check marks and an "x" mark based on the operation of the conflict detection system. UAVC 34 has no conflicts with any UAVs as the check marks indicate. Even though the flight track of UAVC 34 intersects spatially with both other tracks, in this example the UAVs arrive at the intersection points at different times. Altitude is also taken into consideration in the conflict detection algorithm, so two crossing tracks might also not be in conflict if the vertical separation is large enough. UAVA 30 and UAVB 32 do detect a conflict with each other's track, shown as a red X in FIG. 3b. What happens then depends upon timing and specific conflict avoidance contingency behaviors (CACBs) on each UAV as described below.

In order for UAVA 30 and UAVB 32 to detect a potential collision, a time-based simulation of track evolutions over time from time t=0 to time t=I, namely the time limit of the tracks being declared, may be performed. In other words, a UAV may estimate its position at regular intervals between time t=0 and time t=I. In doing so, the earliest conflict of a UAV with another UAV may be detected. At each periodic time interval, each UAV will evaluate the declarations of all other UAVs and compute the 3-dimensional distance between itself and the other UAVs. The distance computed may then be compared to the sum of the sensor-uncertainty radii of the two UAVs plus a safety margin. Since the time-based simulation proceeds from t=0 and then increases from there, the first conflict found is used to perform conflict avoidance contingency behaviors.

Collision Avoidance Contingency Behavior. Once a conflict is detected which may, for example, be by UAVB 32, UAVB 32 needs to determine how to avoid the conflict. Due to the possibility that the UAVA 30 may not be aware of UAVB 32's current track, possibly due to a missed message or because of some other reason, it is incumbent upon UAVB 32 to implement collision avoidance protocols. In an embodiment, a UAV such as UAVB 32 never flies a track when it knows there is a conflict on its current flight track.

There is a wide range of strategies and methods for dealing with conflicts, and which one is implemented in any given scenario may depend on the characteristics of the UAVs involved, the amount of UAV traffic in the area, weather conditions, and other factors that may impact UAV flight patterns. For example, certain UAVs, such as quadrotor UAVs, have the capability to hover while other UAVs, such as fixed-wing UAVs, may not have the capability to hover.

Hover-based CACB Method for Hover Capable UAVs. In an embodiment, a UAV such as UAVB 32 may have the ability to hover. There may be a way to command the UAVB 32 to hover for p seconds, where p is an amount of time between 0 and I. The command may be preprogrammed as part of UAVB's 32 on-board programming to be executed when it detects a conflict, or the command may be externally generated after UAVB 32 notifies an external controller. If it is determined that hovering may be an effective conflict avoidance method, in an embodiment, a randomly selected a hover time p between 0 and I may be selected by UAVB 32. UAVB 32 will then create a track that inserts a HOVER (p) command prior to the track step at which the conflict occurs. UAVB 32 then will evaluate using a simulated conflict detection algorithm or other whether any conflict still exists. If one does so, then UAVB 32 may choose a new random hover time and calculate the simulated track again. If no conflict exists, then UAVB 32 will adopt the new track containing the random hover time and declare that new track through its geocast system. If various hover times are attempted randomly I/1 sec times and all fail, then this process may be deemed to fail, and then other methods as described below may be attempted. By using multiple tries at random hover variables, there is a small probability of failure with this technique. When this occurs however, a hover-capable UAV can use other methods to compute a new track.

Figure 4:
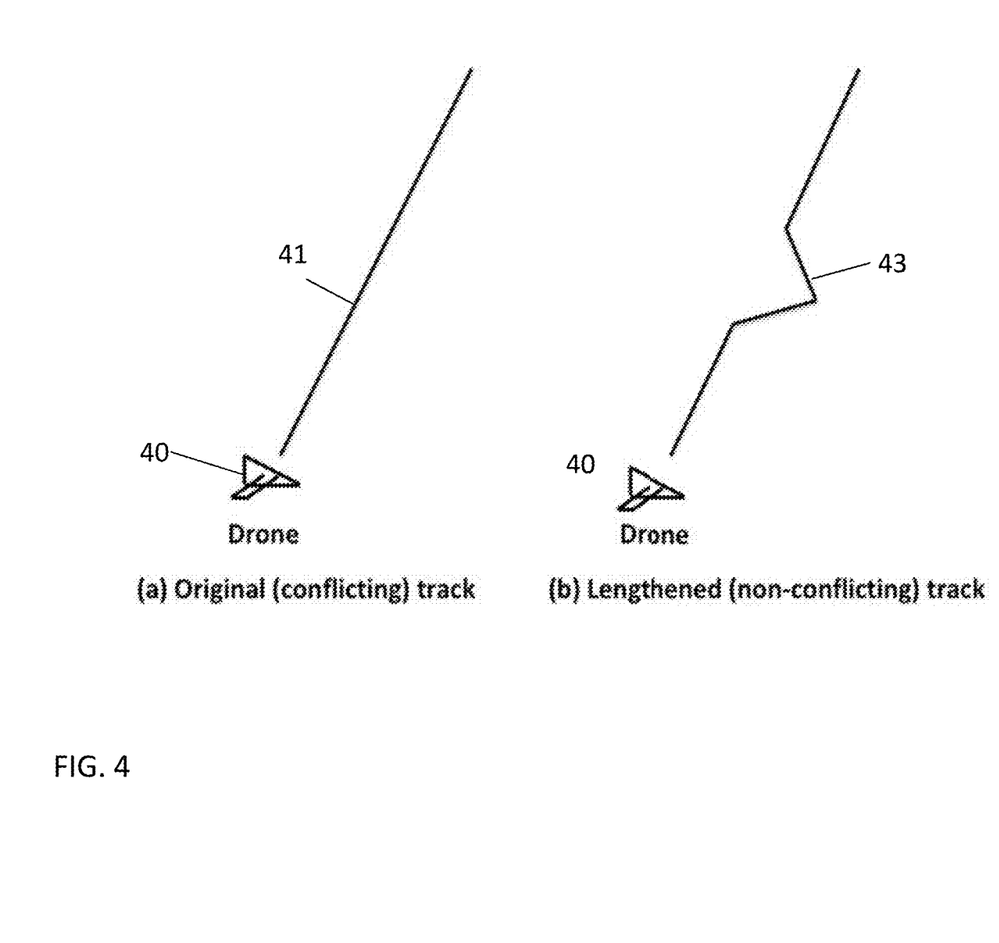
FIG. 4 is a diagram of an exemplary bend solution to avoid collisions in accordance with the present disclosure.

Bend-based CACB Method for Any UAV. With reference to FIG. 4, there is shown UAV 40 having two flight tracks, (a) which is a straight flight track 41 and (b) which has a bending flight track 43. If UAV 40 executes the hover conflict avoidance algorithms which fail or if UAV 40 is not capable of hovering, then UAV 40 may lengthen a flight segment in its flight track by commanding a 45-degree turn followed by a right-angle turn followed by another 45-degree turn back onto the original track 41 to create new flight track 43. By doing so, UAV 40 may thereby delay the time that UAV 40 reaches the conflict point. In order to use the bend methodology, a randomization method be used. UAV 40 may select a track-lengthening distance randomly between L and U, which are parameters computed to be within the performance envelope of UAV 40, insert the bends, and then simulate the new track 43 to see if the conflict has been resolved. Repeated track-lengthening distances may be attempted and simulated until a track-lengthening segment resolves the conflict. The new bending flight track 43 may then be declared in a geocast by UAV 40. In an embodiment, fixed bends may be attempted in lieu of randomly generated trial bends.

Figure 5:
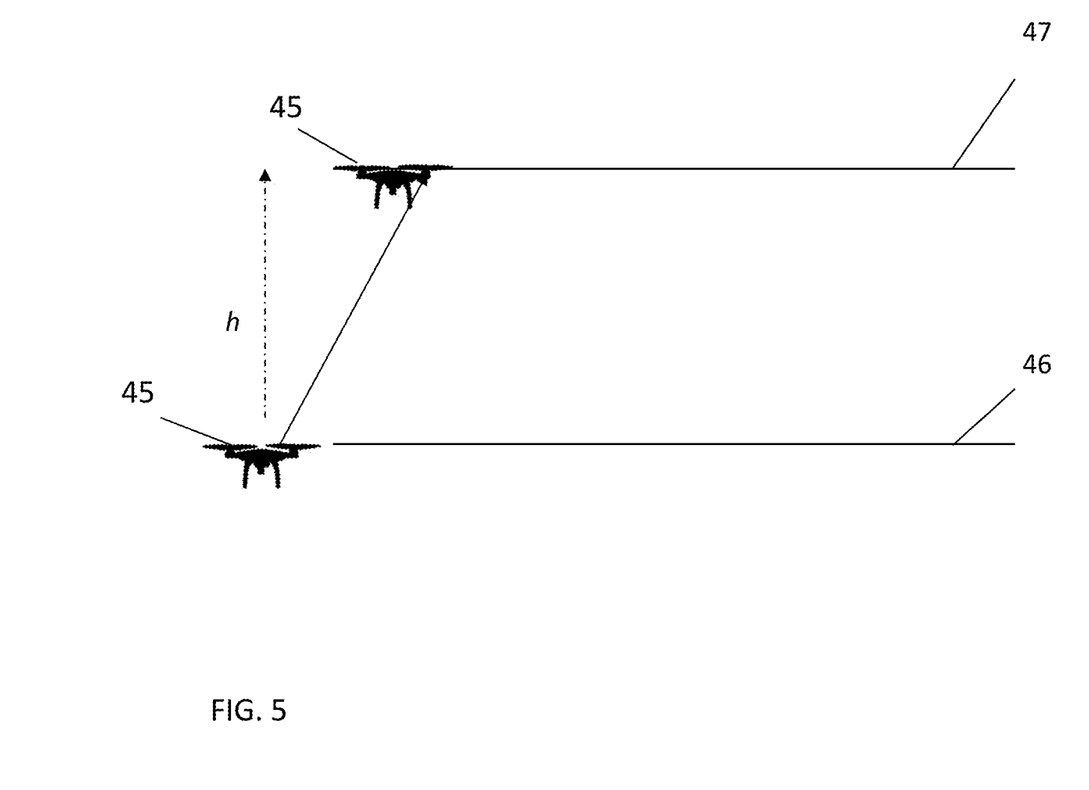
FIG. 5 is a diagram of an exemplary altitude change solutions to avoid collisions in accordance with the present disclosure.

Altitude-based CACB Method for Any UAV. In an embodiment and with reference to FIG. 5, there is shown UAV 45 having a flight path 46 that has a constant altitude. If UAV 45 detects a potential conflict, UAV 45 can be commanded to change altitude h within a given range. Similar to other methods, this method may randomly select the altitude change distance h between L and U to be a function of the maximum of L and the uncertainty radius of the UAV 45 and the uncertainty radius of the conflicting UAV, while the altitude change distance h also being less than U. Assuming the simulation of the new track successfully avoids the conflict, then method then alters the track to command an altitude change of distance h to the new altitude flight track 47 prior to UAV 45 reaching the conflict point, within the performance envelope of the UAV 45. UAV 45 also may return to the original altitude 46 after the conflict point is passed. UAV 45 will simulate the new flight tract to see if the conflict still exists and if so, UAV 45 may attempt a different randomly generated altitude change. This method fails after a bounded number of unsuccessful attempts. In an embodiment, fixed distances may be attempted in lieu of randomly generated trial distances. Once UAV 45 determines its new track, it will declare that track through its geocast system.

Integrating CACB Methods and Other Methods. It will be understood that any combination of CACB methods may be used to calculate, simulate, and declare a new track. It will be understood that the above-examples are not exhaustive and any change in flight path may be calculated, simulated, adopted and declared.

Methods of Use. The following methods are meant to be exemplary only and are not meant to limit the scope of the disclosure or claims in any way.

Figure 6:
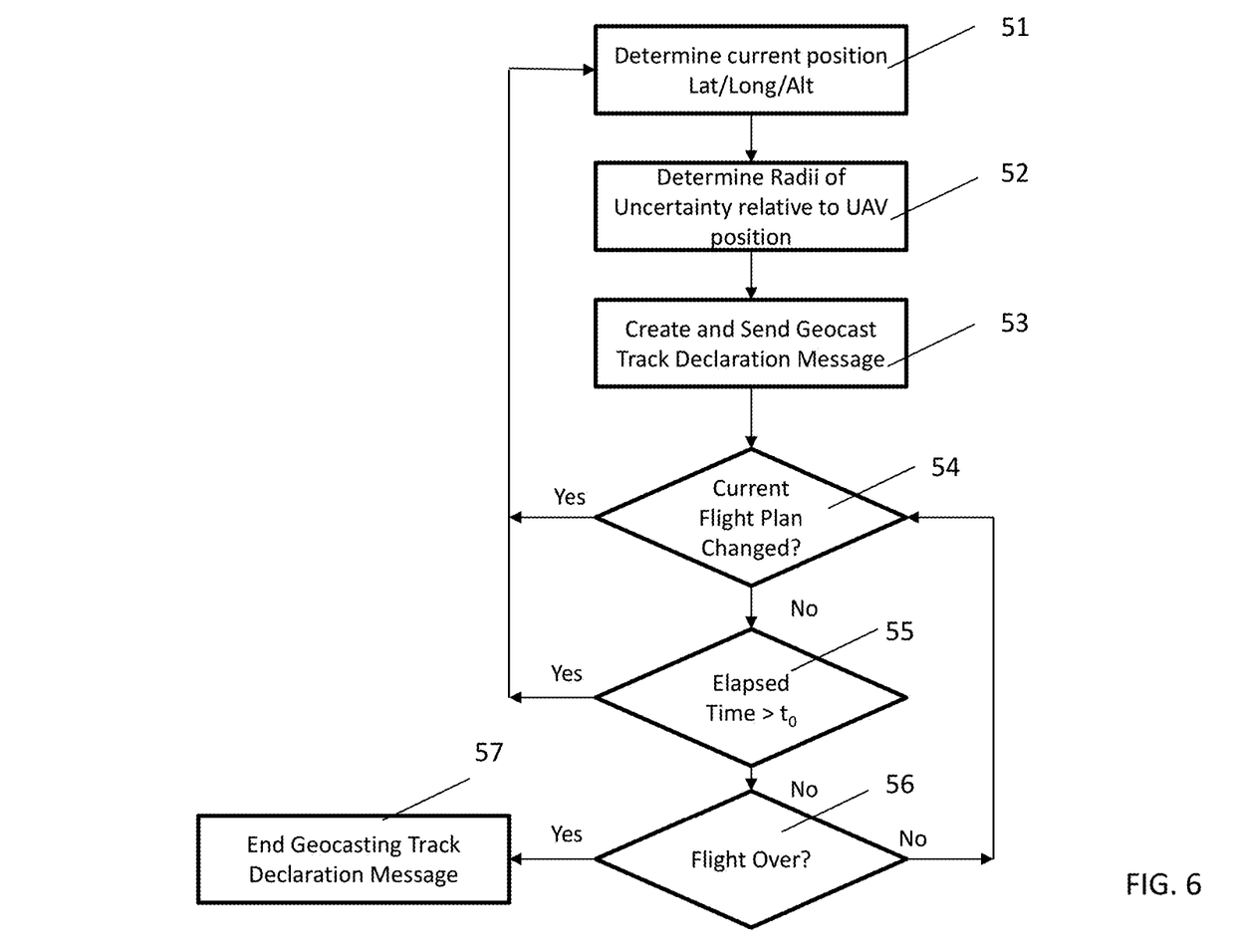
FIG. 6 is an exemplary flow diagram showing the creation of a geocast track declaration.

With reference to FIG. 6, there is shown a flow chart in which a UAV will generate and declare its track through a geocast transmission. At 51, the UAV will determine and optionally record its current position in terms of latitude, longitude and altitude. At 52, the UAV will determine its own radius of uncertainty. The radius of uncertainty may vary and be due to multiple factors, including weather, wind, speed, controllers, and other electrical/mechanical/fuel related attributes of the UAV. At 53, a geocast track declaration message is created and send to through a geocast method to other UAVs within a radius. At 54, a decision is made as to whether the flight path of the UAV has changed. If the flight path of the UAV has changed, then the process restarts at 51 in which the new position is calculated and ultimately a new geocast track declaration method is created and sent. If the track has not changed at 54, a check is made to determine whether the time since the last track declaration method exceeds a threshold t0. If so, then the process repeats at 51 and a newly updated track declaration message is created and set at 53. If the time since the last track declaration message has been sent does not exceed the time threshold, a decision is made as to whether the flight is over at 56. If so, the process stops at 57. If the flight continues, the loop continues at 54 to see if the flight path has changed or if not, then comparing the elapsed time since the last track declaration message was sent to the time threshold at 55. The process will continue while the UAV is in flight until the process ends at 57.

Figure 7:
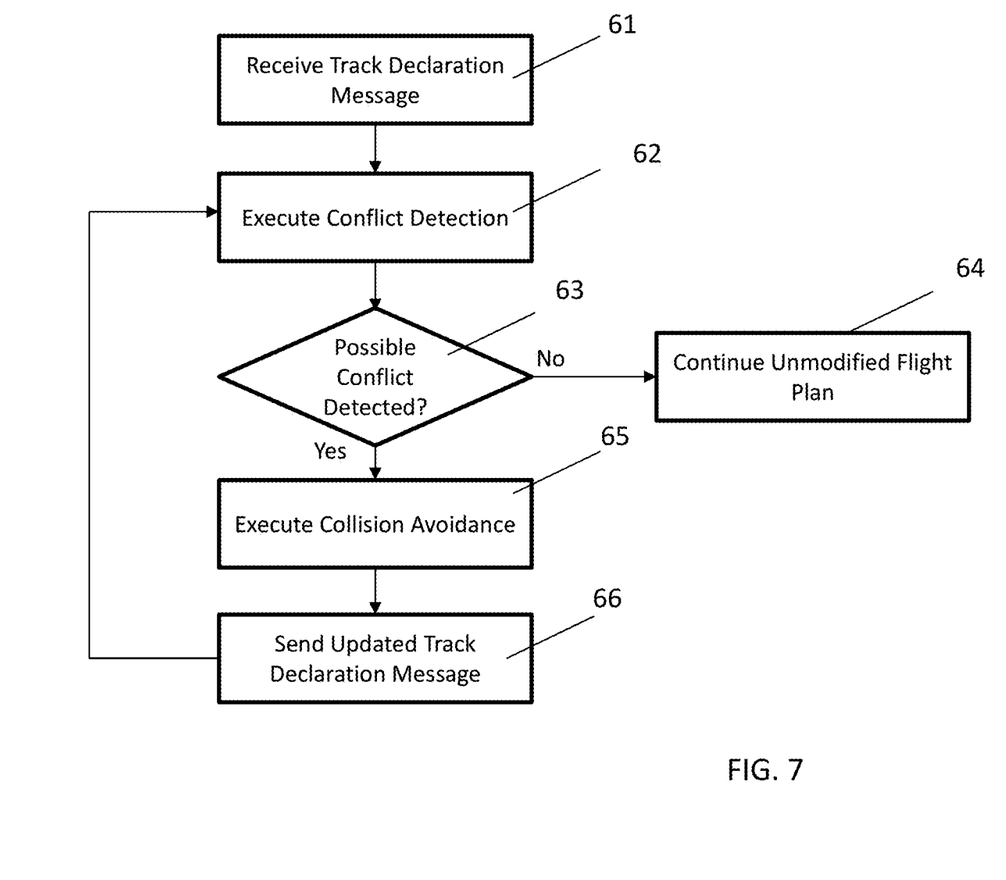
FIG. 7 is an exemplary flow diagram showing the receipt of a geocast track declaration.

With reference to FIG. 7, there is shown an exemplary flow diagram of a process when a UAV receives a track declaration method from a second UAV. At 61, the track declaration message is received. At 62, the receiving UAV executes a conflict detection algorithm to determine, at 63, if a potential conflict between the flight track of the receiving UAV and the second UAV exists. If there is no conflict, the receiving UAV continues on its unmodified flight track 64. If there is a possible conflict detected at 63, the receiving UAV executes a collision avoidance algorithm in which the receiving UAV will execute a collision avoidance plan, simulate the plan to determine if whether the plan resolves the potential conflict, and if so, implement the collision avoidance plan. The collision avoidance plan could be one of hovering, bending, changing altitude, or any other collision avoidance plan which may, for example be similar to a process described below with reference to FIG. 8. Once the collision avoidance plan is determined and executed, the receiving UAV sends an updated track declaration message with the receiving UAVs new flight track at 66. The process continues at 62 with the receiving UAV executing its conflict detection algorithms.

Figure 8:
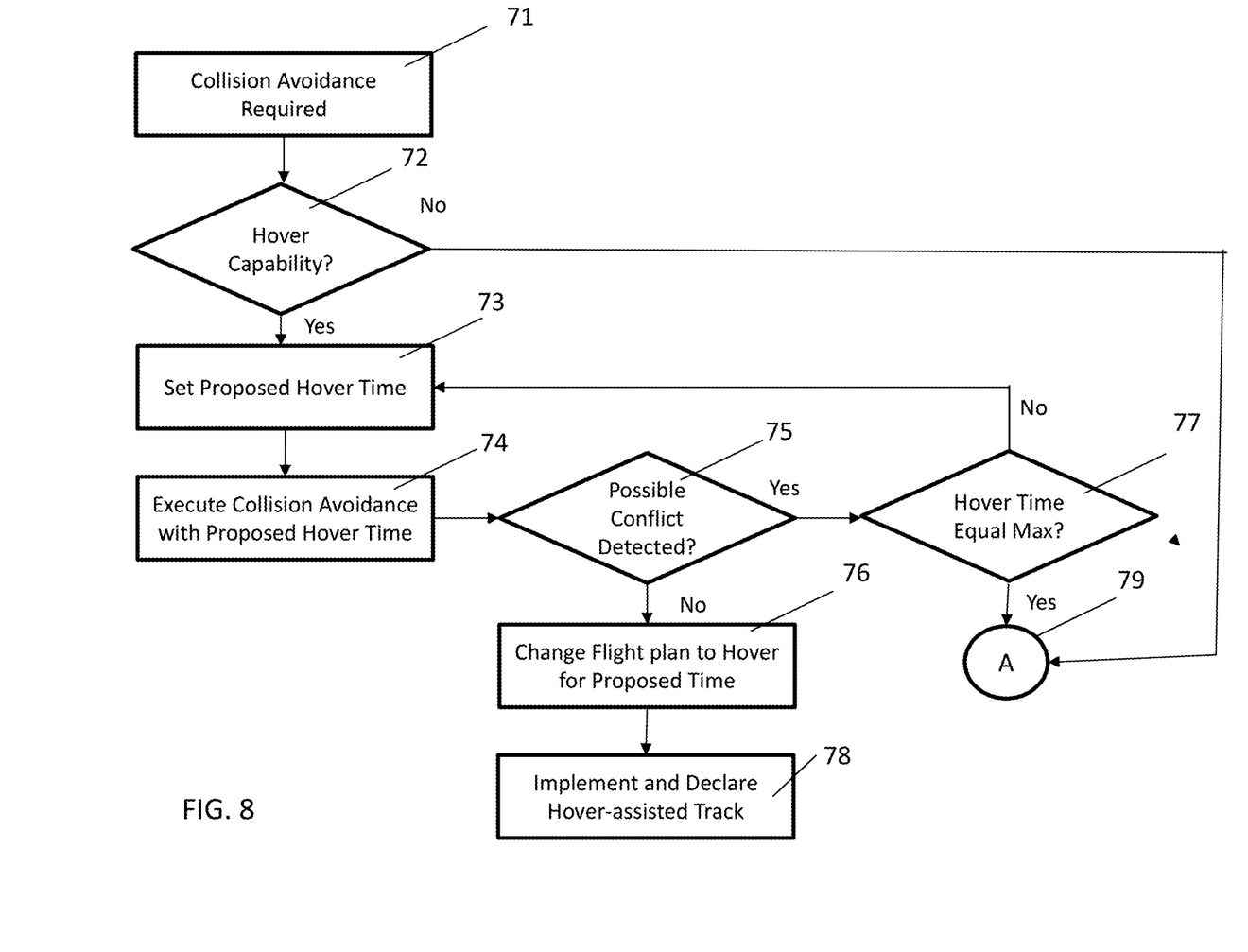
FIG. 8 is an exemplary flow diagram of a conflict avoidance process.

With reference to FIG. 8, there is shown an exemplary flow diagram of a process by which collision avoidance may be implemented. It will be understood that the various methods may be tried in various orders and may include other processes. In an embodiment, the receiving UAV determines that collision avoidance is required at 71. At 72, it is determined whether the receiving UAV has hover capability. If the receiving UAV has hover capability, the proposed hover time is set at 73 and a simulation executed at 74. If the possible conflict is still detected at 75, then a decision is made to determine if the maximum number of hover times has been met at 77. If not, then a new proposed hover time is set at 73 and the trial process continues. If at 75 the conflict is no longer detected, the flight track of the receiving UAV is changed at 76 and the updated track declaration message is sent at 78. If, on the other hand, the conflict is still detected at 75 and the number of trials of the hover time are at its maximum at 77, then the process continues at A 79 in FIG. 9 wherein an alternative conflict avoidance method is attempted.

Figure 9:
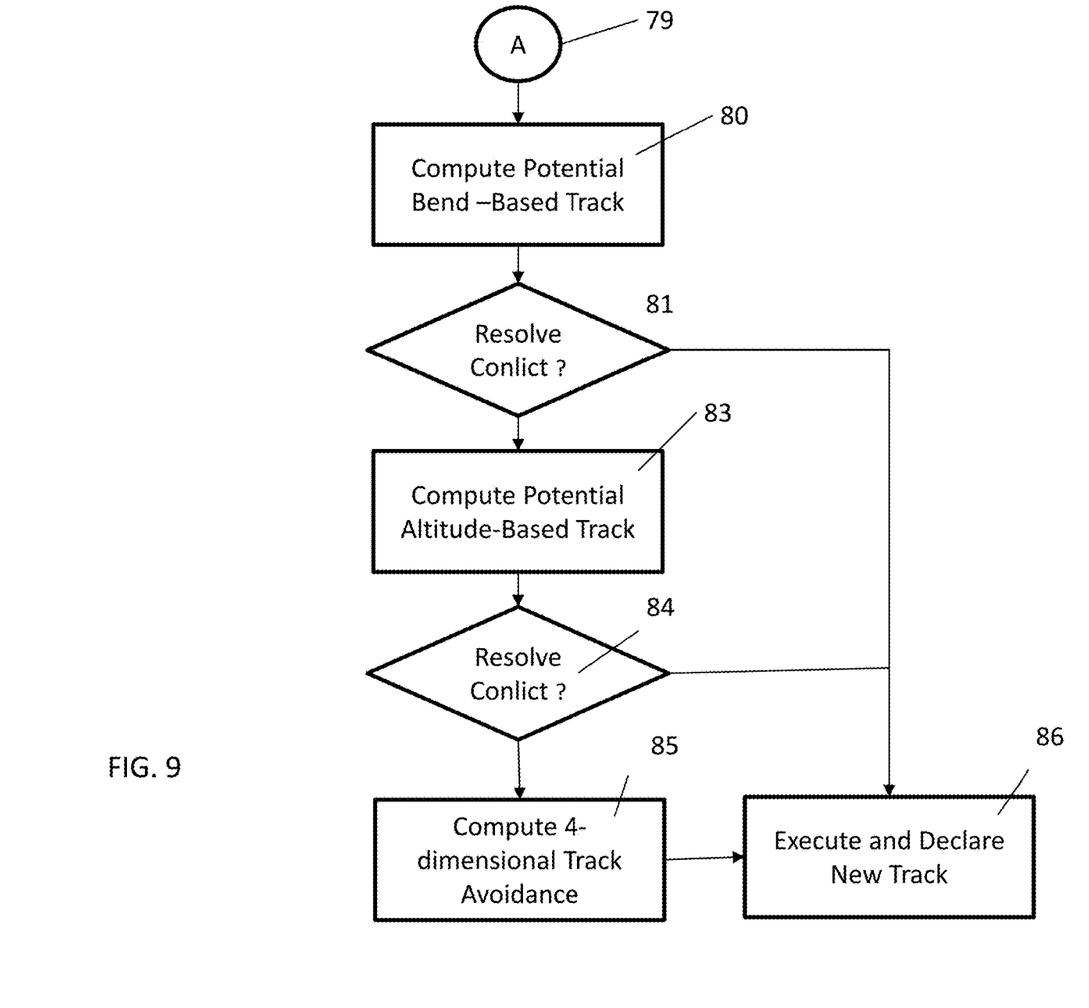
FIG. 9 is a continuation of the conflict avoidance process of FIG. 8.

At 80, the bend-based track avoidance method is attempted. If at 81 it is determined that a bend-based track adjustment will be successful, then the new track is executed and declared at 86. If at 81 it is determined that the bend-based track adjustment will fail, then an altitude-based track adjustment will be computed at 83. If at 84 it is determined that the altitude-based track adjustment will be successful, then the new track is executed and declared at 86. If at 84 it is determined that the altitude-based track adjustment will fail, then a 4-dimensional track avoidance method will be used at 85 with the new track executed and declared at 86. The 4-dimensional track avoidance method will compute possible flight tracks that may, of example, modify one or more of speed, direction, or altitude until the tracts of the two UAVs no longer are in conflict with each other.

Figure 10:
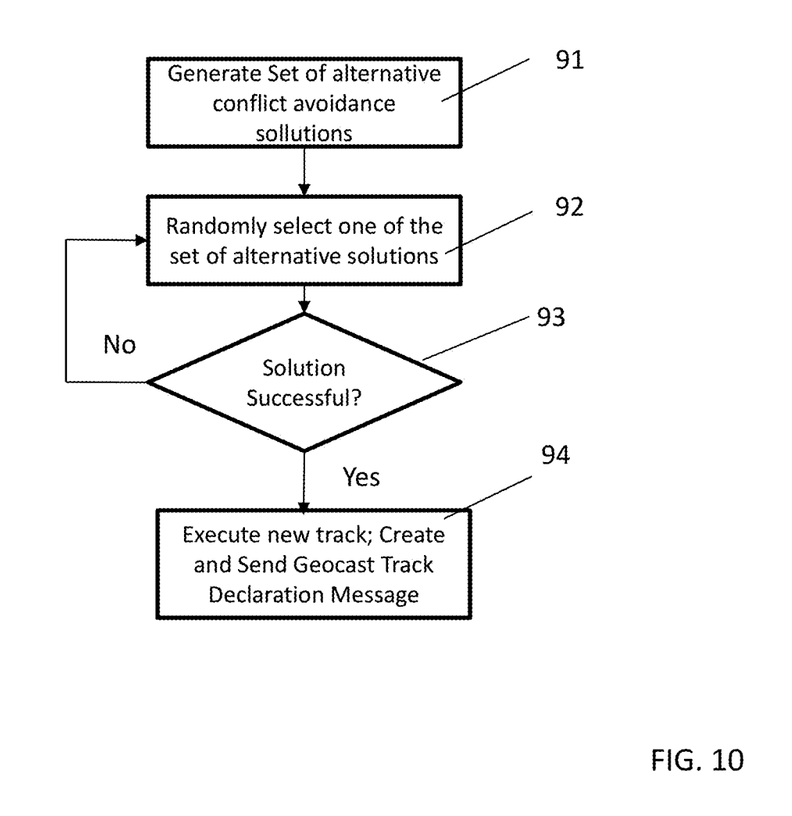
FIG. 10 is an exemplary flow diagram showing the random selection of a set of conflict avoidance maneuvers.

In an aspect, the exemplary method shown in FIG. 10 may be used. In this method, a set of alternative conflict avoidance may be calculated using one or more of the methods set forth above at 91. At 92, one of the set of alternative conflict avoidance methods is randomly selected. Assume there are I alternatives in the set of alternatives, then a number between 1 and I would be randomly generated and the corresponding alternative would be selected. At 93, the selected alternative will be simulated to determine whether the solution would successfully resolve the conflict. If not, another one of the set of alternative solutions will be randomly selected at 92 and the solution tested at 93. Once it is determined that the solution will be successful, the ne track is created, executed and declared at 94.

The method of FIG. 10 may be useful when two or more UAVs have detected potential conflicts with each other. If all the UAVs in potential conflict decided to hover for 10 seconds, for example, the conflict would still exist once the hovering delay was executed. If, on the other hand, each UAV that is reacting to receipt of a track declaration message from another UAV creates a set of possible solutions which may, for example, be a set of 10 solutions, and then each of the UAVs randomly selects one of their respective set of possible solutions for the simulation, the chances of two of the UAVs selecting solutions that remain in conflict are diminished. The larger the set of possible solutions of which one is randomly selected, the lesser the chance that the conflict will remain.

Hybrid Operations. Referring back to FIG. 1, it is possible to combine an integrated and centrally controlled system such as sub-system 10 along with the geocast-based collision avoidance systems and methods described herein. For example, ground control station 8 may provide collision avoidance assistance to UAVs within its control, which may, for example, by UAVs 4, 5, along with providing such assistance to other UAVs (not shown), within its control. Thus, if UAV 4 is in the vicinity of UAV 5 and there are high winds which may affect the current course of each, then ground control station 8 which is tracking the flight path of UAVs 4, 5 may send commands to alter the flight paths of either UAV 4, UAV 5 or both to create safer distances between the two. In parallel to that control, each of UAV 4 and UAV 5 may use the geocast method to declare its track and broadcast that track for the consumption of other UAVs 15, 16, 17 as described herein. As such, UAVs 15, 16 or 17 can take avoidance action to the extent necessary.

Likewise, either of UAV 4 or UAV 5 may receive and act upon track declarations from UAVs 15, 16, 17 and adjust its flight path in accordance with the methods described herein. Assuming UAV 4 receives a geocast declaration from UAV 15 that projects a possible collision, UAV 4 would then need to compute a newly altered flight path. The newly altered flight path may be determined locally at UAV 4 or the potential collision scenario may be relayed to ground control station 8 which then would determine a new flight path and communicate that new flight path to UAV 4 for evasive maneuvers. Regardless of how the newly altered flight path is determined, UAV 4 would then declare and geocast its new flight track.

Although not every conceivable combination of components and methodologies for the purposes describing the present disclosure have been set out above, the examples provided will be sufficient to enable one of ordinary skill in the art to recognize the many combinations and permutations possible in respect of the present disclosure. Accordingly, this disclosure is intended to embrace all such alterations, modifications and variations that fall within the spirit and scope of the appended claims. For example, numerous methodologies for defining in-flight communications may be encompassed within the concepts of the present disclosure.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed:

1. A method comprising:
   determining, by a first UAV, a current position of the first UAV;
   associating, by the first UAV, the current position of the first UAV with a current flight plan of the first UAV;
   geocasting, by the first UAV, a first track declaration message identifying the current position of the first UAV and the current flight plan of the first UAV;
   receiving, by the first UAV, a plurality of track declaration messages wherein each of the plurality of track declaration messages is generated by another UAV;
   detecting, by the first UAV, a potential collision with at least one of the another UAVs based on the comparing step;
   executing, by the first UAV, a first collision avoidance maneuver with the at least one of the another UAVs whose potential collision is associated with a closest elapsed time measurement to $t_0$; and
   geocasting, by the first UAV, an updated track declaration identifying an updated flight plan of the first UAV based on the first collision avoidance maneuver.

2. The method of claim 1 further comprising calculating, by the first UAV, a radius of uncertainty for the current position of the first UAV and wherein the first track declaration message includes the current position of the first UAV in view of the radius of uncertainty.

3. The method of claim 1 further comprising determining, by the first UAV, a time period since the sending step was last executed and if the time period exceeds a threshold time period, then geocasting, by the first UAV, an updated track declaration message.

4. The method of claim 1 further comprising changing, by the first UAV, the current flight plan to an updated flight plan and geocasting, by the first UAV an updated geocast track declaration message identifying the updated flight plan.

5. The method of claim 1 further comprising, detecting, by the second UAV, a potential collision with the first UAV and executing, by the second UAV, a second collision avoidance maneuver.

6. The method of claim 5 wherein the first UAV creates a first set of collision avoidance maneuvers and the second UAV creates a second set of collision avoidance maneuvers and wherein the first collision avoidance maneuver is selected randomly from the first set of collision avoidance maneuvers and the second collision avoidance maneuver is selected from the second set of collision avoidance maneuvers.

7. The method of claim 5 wherein the first UAV creates a first set of collision avoidance maneuvers and wherein the first collision avoidance maneuver is selected randomly from the first set of collision avoidance maneuvers.

8. The method of claim 1 wherein the first collision avoidance maneuver comprises one of hovering by the first UAV, bending the current flight track of the first UAV, or adjusting the altitude of the current flight track of the first UAV to create an updated flight plan.

9. A method comprising:
   broadcasting, by a first UAV, a first track declaration message;
   receiving, by the first UAV, track declaration messages generated by at least one UAV;
   simulating, by the first UAV, a first flight path based on the first declaration, wherein each point on the simulated first flight path is associated with an elapsed time measurement between $t_0$ and $t_n$;
   detecting, by the first UAV, a potential collision with the second at least one UAV based on the receiving simulating step; and
   executing, by the first UAV, a first collision avoidance maneuver in response to the detecting step, wherein the first collision avoidance maneuver comprises one of hovering by the first UAV, bending the current flight track of the first UAV, or adjusting the altitude of the current flight track of the first UAV to avoid colliding with the at least one UAV having a simulated collision time is closest to $t_0$.

10. The method of claim 9, further comprising simulating, by the first UAV, the first collision avoidance maneuver and determining whether the first collision avoidance maneuver will be effective in avoiding the potential collision prior to the executing step.

11. The method of claim 9 further comprising determining, by the first UAV, a first set of collision avoidance maneuvers and wherein the first collision avoidance maneuver is randomly selected from the first set of collision avoidance maneuvers.

12. The method of claim 9 further comprising, geocasting, by the first UAV, a second track declaration message identifying the current position of the first UAV and an updated flight plan of the first UAV based on the first collision avoidance maneuver.

13. A system comprising:
a first UAV and a second UAV and a third UAV, each of the first UAV and the second UAV and the third UAV having a capability to send and receive geocast messages, the first UAV having a first processor and a first memory coupled with the first processor, the first memory having stored thereon executable instructions that when executed by the first processor cause the first processor to effectuate operations comprising:
geocasting a first track declaration message;
receiving a second track declaration message geocast by the second UAV;
receiving a third track declaration message geocast by the third UAV;
simulating a first flight path based on the first declaration, wherein each point on the simulated first flight path is associated with an elapsed time measurement between $t_0$ and $t_n$;
determining a first time elapsed from $t_0$ when the first UAV is simulated to have a collision based on the track declaration of the second UAV;
determining a second time elapsed from $t_0$ when the first UAV is simulated to have a collision based on the track declaration of the third UAV;
based on the simulation, creating a collision avoidance maneuver to avoid a collision with the second UAV if the first time elapsed is shorter than the second time elapsed or to avoid a collision with the third UAV if the second time elapsed is shorter than the first time elapsed;
and
executing the collision avoidance maneuver if the simulating step indicates that the alternative flight track will avoid the collision with either the second UAV or the third UAV.

14. The system of claim 13 wherein the operations further comprise geocasting the alternative flight track.

15. The system of claim 13 further comprising generating a set of collision avoidance maneuvers and the collision avoidance maneuver is randomly selected from the set of collision avoidance maneuvers.

16. The system of claim 13 wherein the collision avoidance maneuver is one of hovering, bending the flight track, or changing the altitude of the flight track of the first UAV.

17. The system of claim 13 further comprising:
the second UAV having a second processor and a second memory coupled with the second processor, the second memory having stored thereon executable instructions that when executed by the second processor cause the second processor to effectuate operations comprising:
geocasting the second track declaration message;
receiving the first track declaration message sent by the first UAV;
determining if a flight track of the first UAV may have a collision based on the flight track of the second UAV;
creating a second collision avoidance maneuver to be performed by the second UAV;
simulating a second alternative flight track of the second UAV based on the second collision avoidance maneuver; and
executing the second collision avoidance maneuver if the simulating step indicates that the second alternative flight track will avoid the collision.

* * * * *